US008072900B2

(12) United States Patent
Antal et al.

(10) Patent No.: US 8,072,900 B2
(45) Date of Patent: Dec. 6, 2011

(54) AUTOMATIC DISTRIBUTION OF SERVER AND GATEWAY INFORMATION FOR POOL CONFIGURATION

(75) Inventors: Csaba Antal, Kiskunlacháza (HU); Attila Takács, Budapest (HU); Lars Westberg, Enköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 158 days.

(21) Appl. No.: 12/521,129

(22) PCT Filed: Dec. 28, 2007

(86) PCT No.: PCT/SE2007/051085
§ 371 (c)(1),
(2), (4) Date: Nov. 13, 2009

(87) PCT Pub. No.: WO2008/082352
PCT Pub. Date: Jul. 10, 2008

(65) Prior Publication Data
US 2010/0061301 A1    Mar. 11, 2010

Related U.S. Application Data

(60) Provisional application No. 60/882,610, filed on Dec. 29, 2006.

(51) Int. Cl.
*G06F 11/00* (2006.01)
*H04J 1/16* (2006.01)
*H04L 12/26* (2006.01)
(52) U.S. Cl. .................... 370/252; 370/253; 370/254
(58) Field of Classification Search .......... 370/252–255, 370/329, 401, 395.4; 455/428, 422.1
See application file for complete search history.

(56) References Cited

U.S. PATENT DOCUMENTS

| 2004/0002332 | A1* | 1/2004 | Noma ............................ 455/428 |
| 2005/0226265 | A1* | 10/2005 | Takatori ........................ 370/452 |
| 2006/0193289 | A1* | 8/2006 | Ronneke et al. ............. 370/329 |
| 2007/0160061 | A1* | 7/2007 | Vasseur et al. ............. 370/395.4 |

OTHER PUBLICATIONS

Ericsson et al: "Proposed modifications to Annex H on MME-UPE spilt", 3GPP TSG WG2 Architecture-S2#55, S2-062797. Aug. 23-25, 2006, Sophia Antipolis, France, retrieved from: http://www.3gpp.org/ftp/tsg-sa/WG2-Arch/Ad-hoc meetings/2006_08_SAE_Sophia/Docs/. the whole document.
Huawei "UPE Selection". 3GPP TSG WG2 Architecture-S2#55, S2-063662, Oct. 23-27, 2006, Busan, South Korea. Retrieved from: http://www.3gpp.org/ftp/tsg_sa/WG2_Arch/TSGS2_55_Bus An/Docs. the whole document.
RAN3: "LS on Definition of Pool Area for LTE"*3GPP TSG-RAN WG3 Meeting #53bis. TDoc R3-061617, Oct. 10-13, 2006: retrieved from: http://www3gpp.org/ftp/tsg-ran/WG3_lu/TSGR3_ 53bis/docs/. the whole document.

* cited by examiner

*Primary Examiner* — Chuong T Ho (57) ABSTRACT

A mobile communications network has separation between a user plane (UP) and a control plane (CP). The network includes plural entities, including plural user plane entities (UPEs), which form the user plane and plural mobility management entities (MMEs), which form the control plane. At least one of the entities is configured to transmit advertisement information. The advertisement information includes status information and configuration information of the at least one entity. The network also includes a node or unit configured to use both the advertisement information and transport information transported on the user plane to select a user plane entity for attachment to a wireless station serviced by the network.

13 Claims, 7 Drawing Sheets

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      LS age         |    Options    |    LS type    |
+-+-+-+-+-+-+-+-+-+-+-+-+-+-+-+-+-+-+-+-+-+-+-+-+-+-+-+-+-+-+-+-+
|                    Link State ID                              |
+-+-+-+-+-+-+-+-+-+-+-+-+-+-+-+-+-+-+-+-+-+-+-+-+-+-+-+-+-+-+-+-+
|                   Advertising Router                          |
+-+-+-+-+-+-+-+-+-+-+-+-+-+-+-+-+-+-+-+-+-+-+-+-+-+-+-+-+-+-+-+-+
|                    LS sequence number                         |
+-+-+-+-+-+-+-+-+-+-+-+-+-+-+-+-+-+-+-+-+-+-+-+-+-+-+-+-+-+-+-+-+
|      LS checksum        |           length                    |
+-+-+-+-+-+-+-+-+-+-+-+-+-+-+-+-+-+-+-+-+-+-+-+-+-+-+-+-+-+-+-+-+
```

*Fig. 8*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Type            |           Length                   |
+-+-+-+-+-+-+-+-+-+-+-+-+-+-+-+-+-+-+-+-+-+-+-+-+-+-+-+-+-+-+-+-+
|                    Service Capabilities                       |
+-+-+-+-+-+-+-+-+-+-+-+-+-+-+-+-+-+-+-+-+-+-+-+-+-+-+-+-+-+-+-+-+
```

*Fig. 9*

AUTOMATIC DISTRIBUTION OF SERVER AND GATEWAY INFORMATION FOR POOL CONFIGURATION

This application claims the benefit of US Provisional Application No. 60/882,610 filed Dec. 29, 2006, the disclosure of which is fully incorporated herein by Reference.

TECHNICAL FIELD

The present invention pertains to telecommunications, and particularly to distribution of configuration and status information between gateways and servers of a network.

BACKGROUND

The Internet is a worldwide, publicly accessible network of interconnected computer networks that transmit data by packet switching using the standard Internet Protocol (IP). The Internet protocols comprise a suite of communication protocols, of which the two best known are the Transmission Control Protocol (TCP) and the Internet Protocol (IP).

In packet-switched networks such as the Internet, a router is a device or, in some cases, software in a computer, that determines the next network point to which a packet should be forwarded toward its destination. A router can be located at any gateway (where one network meets another), including each point-of-presence on the Internet. Routers within the Internet are organized hierarchically. Routers used for information exchange within autonomous systems are called interior routers, which use a variety of Interior Gateway Protocols (IGPs) to accomplish this purpose.

Internet Protocol (IP) routing protocols distribute information between routers and gateways. Whenever other functions in the network rely on distribution of certain information among network nodes, it is convenient to use transport mechanisms of routing protocols. Therefore, there are many examples of the transport mechanism of routing protocols is used for information distribution.

One of the examples is the usage of interior gateway protocols in the Generalized Multi-Protocol Label Switching (GMPLS) protocol family. See, for example, the Open Shortest Path (OSPF) protocol described in RFC2328 "OSPF Version 2", J. Moy April 1998 (incorporated herein by reference); the Intermediate System to Intermediate System [IS-IS] protocol described, e.g., in RFC1142 "OSI IS-IS Intra-domain Routing Protocol" D. Oran, Ed. February 1990) (incorporated herein by reference).

In Generalized Multi-Protocol Label Switching (GMPLS) protocols, IGP protocols distribute information about physical fibers, WDM wavelength, and TDM channels as link state information. IGP protocols are described, e.g., in RFC4203 "OSPF Extensions in Support of Generalized Multi-Protocol Label Switching (GMPLS)"; K. Kompella, Ed., Y. Rekhter, Ed. October 2005 (incorporated herein by reference); and RFC4205 "Intermediate System to Intermediate System (IS-IS) Extensions in Support of Generalized Multi-Protocol Label Switching (GMPLS)", K. Kompella, Ed., Y. Rekhter, Ed. October 2005 (incorporated herein by reference).

Besides connectivity information (link ID, link type, IP address), traffic engineering (TE) information is also distributed to support traffic engineering algorithms in the Path Computation Entity (PCE). IGP extensions for GMPLS rely on traffic engineering extensions of IGP protocols (see, e.g., RFC2370 "The OSPF Opaque LSA Option", R. Coltun July 1998; RFC3630 "Traffic Engineering (TE) Extensions to OSPF Version 2", D. Katz, K. Kompella, D. Yeung September 2003; RFC3784 "Intermediate System to Intermediate System (IS-IS) Extensions for Traffic Engineering (TE)", H. Smit, T. Li June 2004, all of which are incorporated herein by reference. For more information on OSPF-TE and OSPF extensions for GMPLS, see RFC3630 and RFC4203, respectively, which are already incorporated herein by reference.

Besides the extension of link definition, there are many Internet Drafts that propose to extend IGP protocols so that they also advertise node capability information. In GMPLS, one such protocol is "IGP extension for PCE discovery" where PCE servers advertise their configuration information (including location and control capability info) and congestion state information in order to allow PCE clients to select the optimal PCE server. See, e.g., draft-ietf-pce-disco-proto-igp-02 "IGP protocol extensions for Path Computation Element (PCE) Discovery," Jean-Louis Le Roux, pce, 27 Jun. 2006, (incorporated herein by reference). In addition to the PCE discovery IETF draft, there are further drafts discussing the advertising of node capabilities with IGPs. See, for example, draft-ietf-ospf-cap-08 "Extensions to OSPF for Advertising Optional Router Capabilities," AceeLindem, ospf, 2 Dec. 2005 (incorporated herein by reference); and draft-ietf-isis-caps-06 "IS-IS Extensions for Advertising Router Information," J P Vasseur, isis, 5 Jan. 2006 (incorporated herein by reference).

Exterior Gateway Protocol (EGP) routing protocols are also used for conveying non-IP-level information. Border Gateway Protocol (BGP) extensions are used to exchange connectivity information between different sites of a Virtual Private Network (VPN).

The above described usages of routing protocols to distribute non-IP level information shows that their application as a server configuration/status advertisement protocol is also feasible.

Figure 1:
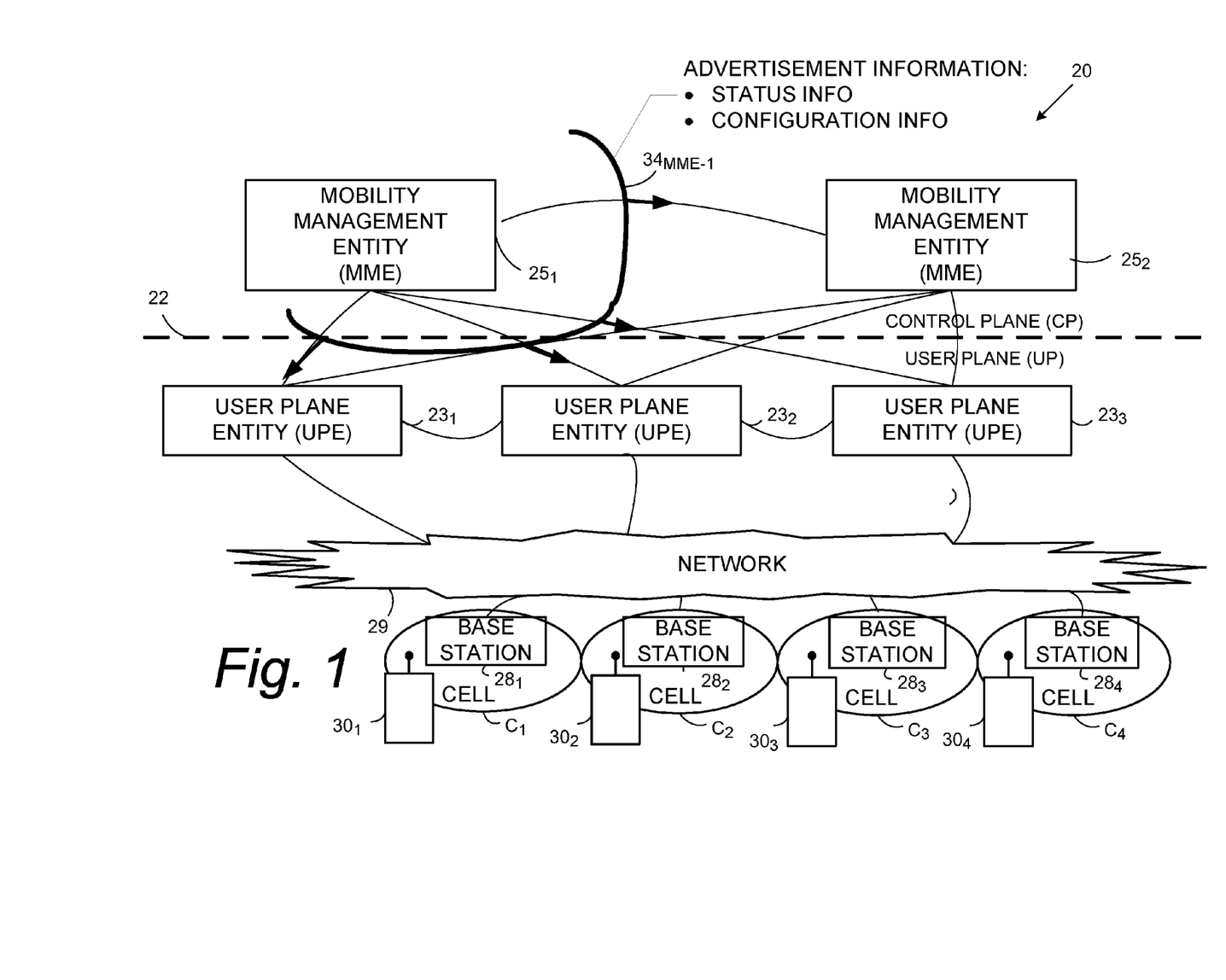
FIG. 1 is a diagrammatic view showing a split architecture logical view of a network comprising both user plane entities and mobility management entities.

The system architecture of future mobile networks (referred to as System Architecture Evolution, or "SAE/LTE") is being worked out in the standardization body known as the Third Generation Partnership Project (3GPP). The central node of System Architecture Evolution (SAE) is the Access & Core Gateway (ACGW), which could have physically separated user and control plane (i.e. split-architecture). In the split architecture, two entities are defined: (1) The Mobility Management Entity (MME) handles control plane (CP) signaling and it is responsible for mobility; and (2) the User Plane Entity (UPE) is the gateway for the user plane (UE) traffic). FIG. 1 shows a split architecture logical view of an example system.

A pooling concept is also discussed in System Architecture Evolution/Long Term Evolution (SAE/LTE) for Mobility Management Entities (MMEs) and User Plane Entities (UPEs), in order to reduce capacity, to increase reliability, and to allow for simplified planning. Mobility Management Entity (MME) pooling is a mechanism by which a base station node (e.g., NodeB) can handle multiple Mobility Management Entities (MMEs) as if they were a single logical entity. When a user requests a service, a mechanism selects one of the physical MME nodes and binds the user to the selected MME.

A similar pooling concept can also be defined for user plane nodes. In the case of user plane pooling, multiple UPE nodes are able to serve user sessions in a given region. It is the task of the MME (or other control plane entity) to select a given UPE from the pool when a user attaches to the network. Accordingly, users (and Base stations) do not see a difference between UPEs within the same pool.

Pooling is also used in earlier mobile systems (e.g., Iu-flex for Serving GPRS support Node (SGSN) pooling). See, e.g., 3GPP TS 23.236 "Intra-domain connection of Radio Access Network (RAN) nodes to multiple Core Network (CN) nodes, v 5.4.0; and v 6.3.0 which is incorporated herein by reference.

In operational networks, pooling configuration and gateway selection (in the SAE context MME and UPE selection) is based on statically preconfigured information. That is, intelligent UPE selection involves considerable configuration in MMEs (pool membership, server loads, transport info, supported services, node capacities) that needs to be aligned with the configuration of Base stations and UPEs. Therefore, it is likely that UPE selection will not consider part of this information.

Static pooling configuration makes configuration management of pools more cumbersome. For example, in a scenario where less expensive (and thus less reliable and smaller) User Plane Entities (UPEs) are used, network redundancy provided by pooling would allow for high network reliability. In this scenario, however, adding and removing UPEs (dynamically) to/from pools may become a frequent event, affecting configuration significantly.

SUMMARY

In one of its aspects, the present technology concerns a system comprising a mobile communications network having separation between a user plane and a control plane. The system comprises plural entities, including plural user plane entities (comprising the user plane) and plural mobility management entities (comprising the control plane). At least one of the entities is configured to transmit advertisement information. The advertisement information comprises status information and configuration information of the at least one entity. The system further comprises a node configured to use both the advertisement information and transport information to select a user plane entity for attachment to a wireless station serviced by the network.

In an example embodiment, the status information comprises load information and availability information; the configuration information comprises supported services information and pool membership information; the transport information includes such information as topology information or other information distributed by traffic engineering extensions of IGP routing protocols. In one example implementation, the advertisement information is included in a Routing Information Protocol (RIP) message. In another example implementation, the advertisement information is included in an Open Shortest Path (OSPF) protocol message. In yet another example implementation, the advertisement information is included in an Intermediate System to Intermediate System (ISIS) message.

In an example embodiment, the plural mobility management entities are organized into pools.

Another aspect of the technology concerns a node of a mobile communication network which is configured to use both advertisement information as transmitted from stratified plane entities and transport information to select a user plane entity for attachment to a wireless station serviced by the network. The advertisement information comprises status information and configuration information of the stratified plane entities. The stratified plane entities comprise plural user plane entities of a user plane and plural mobility management entities of a control plane. The node is preferably a Mobility Management Entity (MME).

Another aspect of the technology concerns a method of operating a mobile communications network having separation between a user plane and a control plane, the network comprises plural entities (the plural entities including plural user plane entities comprising the user plane and plural mobility management entities comprising the control plane); the method comprising receiving advertisement information from at least one of the plural entities; and using both the advertisement information and transport information to select a user plane entity for attachment to a wireless station serviced by the network. The advertisement information comprises status information and configuration information of at least one of the plural entities.

In an example implementation, the method further comprises using one or more of the following factors to select the user plane entity: (1) location of a radio access network base station node which serves the wireless terminal; (2) topology information concerning a transport network interconnecting the base station node which serves the wireless terminal and the user plane entities; (3) user plane entity information from the IGP routing protocol; (4) subscriber information; (5) and administratively configured rules.

Thus, system and method are disclosed which automatically distribute configuration and status information between gateways and servers by the extension of IGP routing protocols (e.g., Open shortest Path First Protocol [OSPF] and Intermediate System to Intermediate System [IS-IS]) in a mobile system. The system and method allow for intelligent gateway selection (e.g., UPE selection) using status (load and reachability of servers) and configuration (e.g., supported services, pool membership) of gateways/servers and to combine it with transport information (information distributed by traffic engineering extensions of IGP routing protocols). The system and method further allow for easier pool configuration where adding a new node (Base station, UPE, MME) does not require any configuration in the "old" members of the pool.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

In one of its aspects, the present technology concerns a system comprising a mobile communications network 20 having separation between a user plane and a control plane. In FIG. 1, the separation between user plane UP and data or control plane CP is depicted by delineator 22. The network comprises plural entities, including plural user plane entities (UPE) 23 (comprising the user plane UP) and plural mobility management entities (MME) 25 (comprising the control plane CP). Merely for sake of example illustration, FIG. 1 includes three user plane entities (UPE) 23$_1$, 23$_2$, and 23$_3$ and two mobility management entities (MME) 25$_1$, and 25$_2$. It will be appreciated that other numbers of user plane entities 23 and mobility management entities 25 can be employed, and the number of such entities is not critical to or limiting of the present technology.

Figure 2:
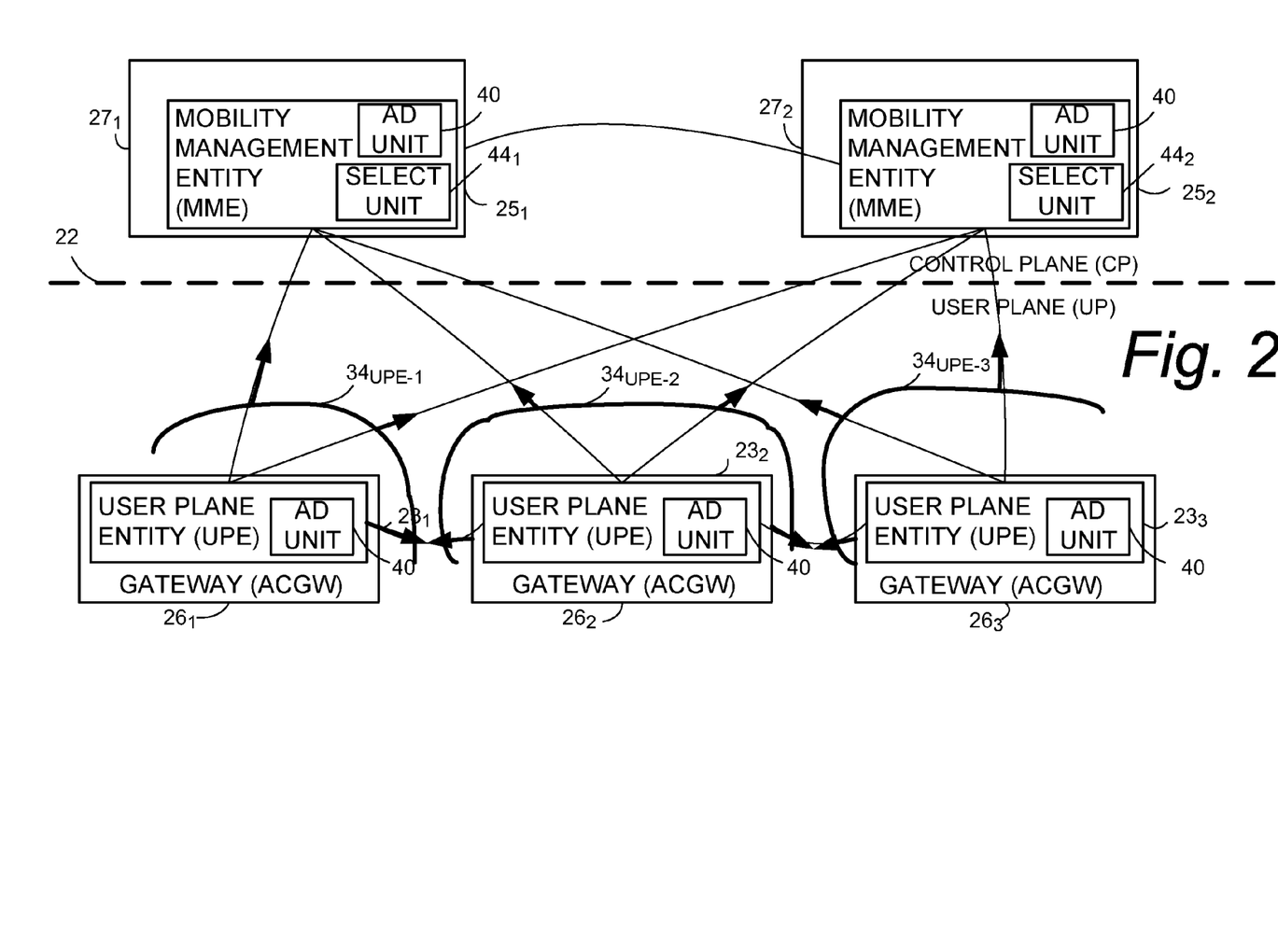
FIG. 2 is a diagrammatic view of an example implementation of the network of FIG. 1 and further showing each of plural user plane entities sending advertisements to other entities.

FIG. 2 illustrates a particular example implementation of the generic embodiment of FIG. 1 wherein, e.g., the user plane entities 23 and mobility management entities 25 are hosted or housed at or comprises gateways 26. In particular, and by way of non-limiting example, each of user plane entities 23 are shown as being located at a separate Access and Core Gateway (ACGW) 26. In other words, in the specific implementation shown in FIG. 2, each of user plane entities 23 is associated with a different gateway 26. For example, user plane entity (UPE) 23$_1$ is associated with gateway 26$_1$; user plane entity (UPE) 23$_2$ is associated with gateway 26$_2$; and, user plane entity (UPE) 23$_2$ is associated with gateway 26$_3$. Moreover, in the example illustration of FIG. 2, the mobility management entities 25 are hosted or housed at servers 27. In particular, and by way of non-limiting example, each of mobility management entities 25 is shown as being located at a separate server 27 (e.g., mobility management entity (MME) 25$_1$ is associated with server 27$_1$ and mobility management entity (MME) 25$_2$ is associated with sever 27$_2$). The servers 27 can be located at one of the gateways such as gateways 26, or another node of the network.

Thus, as used herein, the user plane entity (UPE) 23 is an example of a gateway and can have its functions fulfilled by a gateway 26. The mobility management entity (MME) 25 is an example of a server and can have its functions fulfilled by a server 27. Accordingly, wherever the terms "UPE" and "user plane entity (UPE)" are employed they should be understood generically to encompass (without limitation) a gateway. Similarly, wherever the terms "MME" and "mobility management entity (MME)" are employed it should be understood generically to encompass (without limitation) a server.

In other implementations, there need not be such unique association between entity on the one hand, or a gateway or server on the other hand, since plural entities can share gateways/servers. Moreover, as mentioned above, one or more of the servers 27 may be situated at one or more gateways 26.

However housed or situated, the entities such as user plane entities 23 and mobility management entities 25 are connected in a manner such that messages of one or more protocols can be transmitted between the entities. Such connection facilitates, among other things, the ability of an entity to transmit advertisement information, as hereinafter explained.

Mobile communications network 20, and particularly a radio access network portion of mobile communications network 20, comprises plural nodes known as Base stations 28, also denoted NodeB. As will be appreciated by those skilled in the art, a "NodeB" or "BNode" is also often called "radio base station", "RBS", "eNodeB", "base station transceiver", or "BTS". While the terminology "NodeB" is common for recent WCDMA generations, use of Base station herein should be understood to refer to any similar node in the same or other radio access networks. Moreover, for sake of example, Base stations are illustrated in FIG. 1 and other figures: Base stations 28$_1$-Base station 28$_4$. The number of Base stations 28 is not critical or even germane to the technology described herein.

The base stations 28 are connected to user plane entities 23 and to other nodes through a radio access network which is encompassed by network 29 shown in FIG. 1. The network 29 may include a transport network as well as a wireless transport network.

In the illustrated implementation of FIG. 1, each Base station 28 is associated with a corresponding cell C. For example, Base station 28$_1$ is associated with cell C$_1$; Base station 28$_2$ is associated with cell C$_2$; and so forth. A cell is a geographical area where radio coverage is provided by the radio base station equipment at a base station site. Each cell is identified by a unique identity, which is broadcast in the cell.

FIG. 1 further illustrates that the Base stations 28 communicate over the air interface (e.g., radio frequencies) with wireless stations (WS) 30 located within range of the base stations. In other words, the Base stations 28 serve wireless stations (WS) 30 located within the ambit of the respective cell. For example, Base station $28_1$ serves wireless station $30_1$; Base station $28_2$ serves wireless station $30_2$; and so forth. It will be appreciated that the wireless stations 30 can be user equipment units (UEs) or mobile stations such as mobile telephones ("cellular" telephones) and laptops with mobile termination, and thus can be, for example, portable, pocket, hand-held, computer-included, or car-mounted mobile devices which communicate voice and/or data with radio access network.

At least one (and preferably many, if not all) of the entities (e.g., user plane entities 23 and mobility management entities 25) is configured to transmit advertisement information. As an example illustration of this advertisement transmission capability, FIG. 1 shows mobility management entity (MME) $25_1$ sending an advertisement front $34_{MME-1}$ to plural other entities, e.g., to each of user plane entities $23_1$-$23_3$ and to mobility management entity (MME) $25_2$. The advertisement front can take the form of separate advertisement messages sent to each of the other entities. To this end, FIG. 2 illustrates, for an example implementation of the embodiment of FIG. 1, each entity as comprising an advertising unit ("ad unit") 40 which is configured to and responsible for sending a comparable advertisement front. As shown in FIG. 1, the advertisement information included in advertisement front $34_{MME-1}$ includes both status information and configuration information for the sending entity. Examples of status information and configuration information are provided below.

Although only the mobility management entity (MME) $25_1$ as is shown in FIG. 1 as sending an advertisement front 34, it should be understood that more, and preferably all, of the user plane entities 23 and mobility management entities 25 of the example implementation comprise an advertisement unit 40 which is responsible for sending comparable advertisement fronts. For example, FIG. 2 shows that each of the user plane entities 23 send out respective advertisement fronts 34. For example, user plane entity (UPE) $23_1$ sends out advertisement front $34_{UPE-1}$; user plane entity (UPE) $23_2$ sends out advertisement front $34_{UPE-2}$; and so forth. As in the case of advertisement front $34_{MME-1}$, the advertisement information included in advertisement fronts 34 for user plane entities 23 include both status information and configuration information for the sending entity.

Figure 3A:
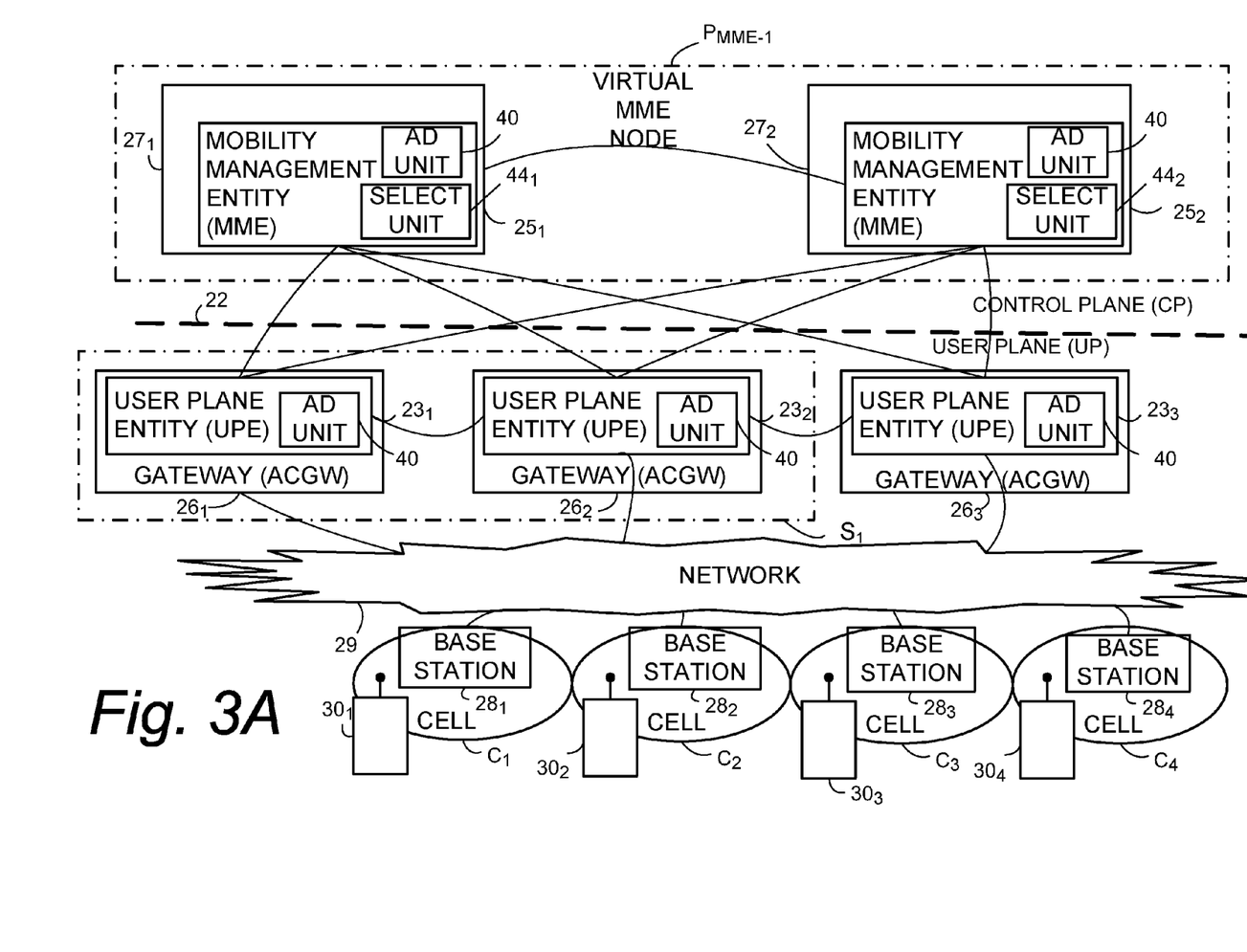
FIG. 3A is a diagrammatic view of the network of FIG. 1 showing nodes of the network, plural user plane entities, and plural mobility management entities organized into pools.

FIG. 3A shows an example embodiment of communications network 20 wherein mobility management entities such as those of the example of FIG. 2 are organized into a pool, each pool of mobility management entities thereby forming a virtual mobility management entity node. For example, FIG. 3A shows mobility management entity (MME) $25_1$ and mobility management entity (MME) $25_2$ forming a pool $P_{MME-1}$ which also serves as a virtual mobility management entity node. A MME pool such as pool $P_{MME-1}$ (framed by a dotted-dashed line) may comprise one or more mobility management entities (MME) 25. For sake of illustration the example of FIG. 3A is shown as comprising two mobility management entities (MME) 25, yet it should be appreciated that another number of mobility management entities may comprise the pool and thus the virtual node. In the illustrated example implementation of FIG. 3A, the mobility management entity pool $P_{MME-1}$ (e.g., virtual MME node) is associated with a set or pool of user plane entities. In one example implementation, which user plane entities are associated with a particular mobility management entity pool or mobility management entity may be defined locally at the mobility management entity. In particular, for the example implementation of FIG. 3 user plane entities $23_1$ and $23_2$ (framed by a dotted-dashed line) are associated with mobility management entity pool $P_{MME-1}$. The set or pool of user plane entities associated with a particular mobility management entity pool may be a unique set of user plane entities. A base station is typically assigned to a particular mobility management entity (MME) 25. As explained herein, a mobility management entity of the mobility management entity pool selects an appropriate one of the user plane entities 23 of its associated set to serve a base station node which, in turn, serves a wireless station seeking attachment.

Figure 3B:
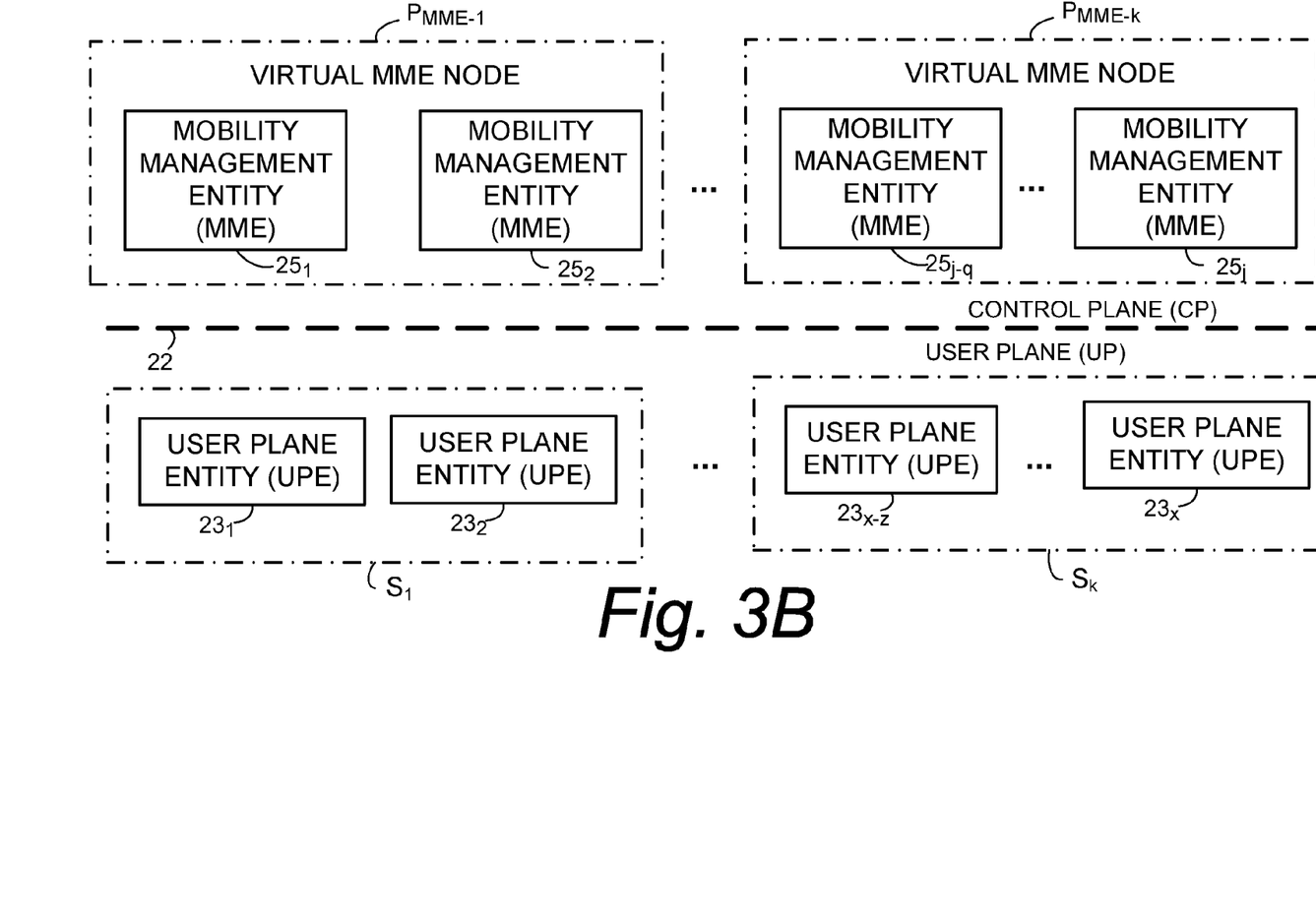
FIG. 3B is a diagrammatic view illustrating an example context of other mobility management entity pools and sets of user plane entities.

FIG. 3B illustrates the one mobility management entity pool $P_{MME-1}$ or virtual mobility management entity node in an example context of other mobility management entity pools and sets of user plane entities. In like manner as FIG. 3A, one pool $P_{MME-1}$ is associated with user plane entity set $S_1$. FIG. 3B further illustrates other mobility management entity pools up to pool $P_{MME-k}$ and further user plane entity sets up to set $S_k$. The mobility management entity $P_{MME-k}$ is shown as comprising mobility management entities $25_{j-q}$ through $25_j$. The user plane entity set $S_k$ is shown as comprising user plane entities $23_{x-z}$ through $23_x$. Thus, it will be appreciated that the number of mobility management entities can vary for each mobility management entity pool, that numerous mobility management entity pools can exist in the control plane (CP), and likewise that the user plane (UP) may include many sets of user plane entities having same or differing numbers of user plane entities. In some sense, a mobility management entity pool and its associated set or pool of user plane entities may also be considered as a pool, and in a transaction involving attachment of a wireless terminal served by a base station the base station may also be considered as participating in such an expanded sense of the pool. Moreover, in some (unillustrated) implementations the pools P may be at least partially overlapping, e.g., an entity (such as an MME) may be a member of more than one pool.

FIG. 2 further illustrates that the mobility management entities 25 of the example implementation of network 20 comprise select unit or selection unit 44. The selection unit 44 of each mobility management entity (MME) 25 is configured to use both the advertisement information and the transport information, as advertised by other entities such as the user plane entities 23, to select a user plane entity for attachment to a wireless station 30 serviced by the network. (In servicing the wireless station 30, the network performs such operations as handling bearers (e.g., radio bearers) for a connection involving the wireless station). An example selection process is described further below.

Figure 4:
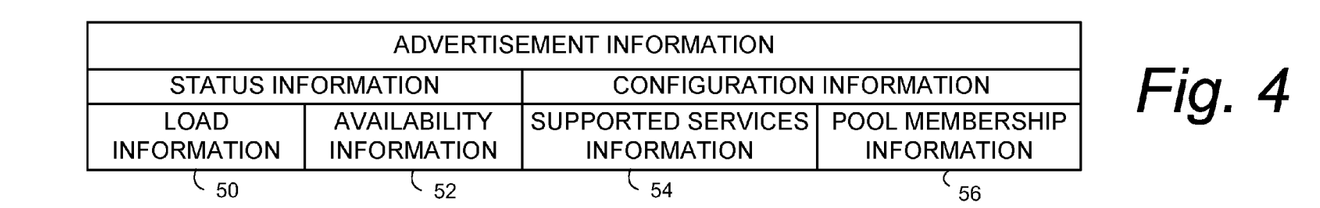
FIG. 4 is a diagrammatic view of an example format of example advertisement information.

As mentioned above, the advertisement information included in advertisement fronts 34 for entities such as user plane entities 23 and mobility management entities 25 includes both status information and configuration information for the sending entity. In an example embodiment, and as shown in FIG. 4, the status information comprises load information 50 and availability information 52. The load information 50 comprises, in an example implementation, one or more of (1) information about load on a node(s) in the network; and (2) information about load on a link(s) of the network. The configuration information comprises supported services information 54 and pool membership information 56.

Figure 5A:
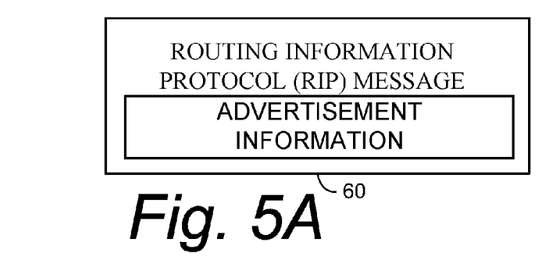
FIG. 5 are diagrammatic views showing alternative example messages which can host advertisement information.
Figure 5B:
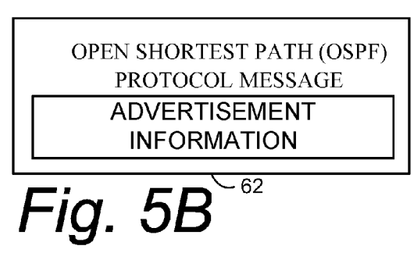
Figure 5C:
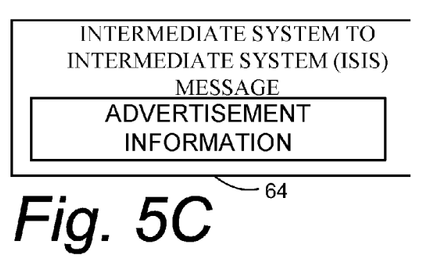

In one example implementation, the advertisement information is included in a Routing Information Protocol (RIP)

message 60 (see FIG. 5A). In another example implementation, the advertisement information is included in an Open Shortest Path (OSPF) protocol message 62 (see FIG. 5B). In yet another example implementation, the advertisement information is included in an Intermediate System to Intermediate System (ISIS) message 64 (see FIG. 5C).

In accordance with an aspect of the technology, both UPE and/or MME nodes distribute information via IGP protocols for automatic pooling configuration and node selection in the pool. The technology includes and/or covers the following areas, each of which are separately discussed below: (1) Extension of IGP protocols; (2) Server/gateway selection within a pool; and (3) Automatic pool configuration with built-in redundancy.

Extension of IGP Protocols

The OSPF protocol (described, e.g., in RFC2328 "OSPF Version 2", J. Moy April 1998, [incorporated herein by reference]) was extended to support traffic engineering (TE). See, e.g., OSPF-TE, or RFC3630 "Traffic Engineering (TE) Extensions to OSPF Version 2", D. Katz, K. Kompella, D. Yeung September 2003, incorporated herein by reference. More specifically a general data type is defined for OSPF, the Opaque Link State Advertisement (LSA). See, e.g., RFC2370 "The OSPF Opaque LSA Option", R. Coltun, July 1998 (incorporated herein by reference).

Figure 8:
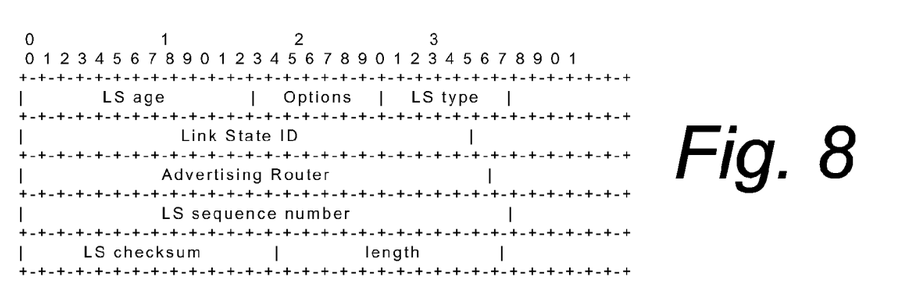
FIG. 8 is a diagrammatic view showing an example link service advertisement (LSA) header.

All link state advertisements (LSAs) begin with a common 20 byte header, illustrated by way of example in FIG. 8. This header contains enough information to uniquely identify the LSA (LS type, Link State ID, and Advertising Router). Multiple instances of the LSA may exist in the routing domain at the same time. It is then necessary to determine which instance is more recent. This is accomplished by examining the LS age, LS sequence number, and LS checksum fields that are also contained in the LSA header.

Various fields or information elements of the LSA header of FIG. 8 are briefly described in Table 1.

Several events may cause a new instance of an LSA to be originated. Some of the reasons/events causing LSA origination apply to all OSPF routers and are as follows: (1) Periodic update; update interval configured via LSRefreshTime; (2) an interface's state changes (e.g. goes up/down); (3) an attached network's Designated Router changes; and (4) one of the neighboring routers changes to/from the FULL state.

With OSPF-TE a new TE-LSA is specified. The TE-LSA carries detailed link state information. The TE-LSA is constructed of two top-level TLV elements: (1) Router Address TLV and (2) Link TLV. In the current specification the Link TLV includes detailed link level information while the Router Address TLV defines a stable router address.

"TLV" stands for a "Type-Length-Value" element. In a message or the like, optional information may be encoded as a type-length-value or TLV element inside of data communication protocols. The type and length fields are fixed in size (e.g., 1-4 bytes) and the value field is of variable size. These fields are used as follows: A "type" field includes a numeric code which indicates the kind of field that this part of the message represents. A "length" field specifies the size (typically in bytes) of the value field. The "value" field is a variably sized set of bytes which contains data for this part of the message.

The present technology extends the Router Information LSA for OSPF and the Intermediate System to Intermediate System (ISIS) Capability TLV ([ISIS-CAP]) for Intermediate System to Intermediate System (ISIS).

Both UPE and MME nodes can send IGP messages to advertise their capability and status information. To support UPE selection in the pool the UPEs should distribute status information, which may be interpreted by nodes that selects UPE from the pool (MME or Base station). To support MME selection MMEs may also distribute capability and status information to other MMEs and Base stations.

UPE Information

UPEs advertise configuration and status information by adding new TLV/sub-TLVs to OSPF links state advertisements /LSAs/ (using opaque LSA option) and to IS-IS links state protocol data units /LSPs/.

The UPE Configuration Information comprises the following:
Node type: This field indicates that role of the sending node in mobile network (i.e., an UPE)
Location: IP address of UPE
Pool ID: An ID that refers to all nodes in the pool in MMEs, UPEs and Base stations.
Service capability: Indicates what services are supported in the MME. E.g., Internet access, corporate access, security features, and deep packet inspection.

Figure 9:
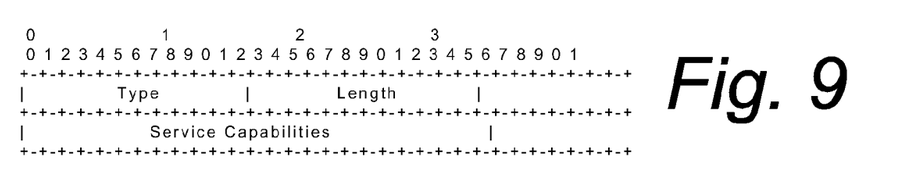
FIG. 9 is a diagrammatic view showing an example message format that allows provision of this "service capability".

An example message format that allows provision of this "service capability" is shown in FIG. 9. The fields of the message of FIG. 9 include: (1) a "Type" field which is a 16-bit field set to a new unused value; (2) a "Length" field of 16-bits that indicates the length of the value portion in octets and will be a multiple of 4 octets dependent on the number of capabilities advertised (Initially, the length will be 4, denoting 4 octets of informational capability bits); and (3) a "Value" field of variable length sequence of capability bits rounded to a multiple of 4 octets padded with undefined bits. Initially, there are 4 octets of capability bits. The bits are numbered left-to-right starting with the most significant bit being bit 0. A bit is assigned to each capability. Setting a bit to "1" indicates that the node supports that capability.

Another message format could be to reuse the Router Informational Capabilities TLV, which become an RFC recently (Extensions to OSPF for Advertising Optional Router Capabilities, RFC 4970). This standard applies also a bitmap to indicate capabilities, but for routers and not for gateway nodes. In this RFC, only the first 5 bits are defined, bits 6-31 are unassigned, so they could be used to signal gateway capabilities.

The UPE Status information comprise the following:
UPE load: The current load of the gateway is provided with a necessary granularity. One example of granularity is to divide the 0-100% load range to 10 intervals. Moreover, to avoid frequent load updates hysteresis can be applied.
UPE availability information: In order to detect gateway failures, availability of gateways is also updated.

Advertisement of status information should be handled by care because too frequent LSAs may jeopardize the operation of the network. One solution is advertise in separate LSAs. One example "technique" is to limit the accuracy of status information, e.g., status advertisement is advertised only if it means significant change. As an example, if the load changed from 40% to 60%, then it may not be advertised but if it exceeds 80%, then it is advertised. Another tool is that routers can refuse to accept LSA updates more frequently than once every MinLSArrival seconds. Accordingly, by this tool, if LSAs are generated too frequently, then some of them will be dropped.

MME information

MMEs may also advertise configuration and status information by adding new TLV/sub-TLVs to OSPF links state advertisements/LSAs/ (using opaque LSA option) and to IS-IS links state protocol data units/LSPs/.

The MME Configuration information comprises the following:

Node type: This field indicates that role of the sending node in mobile network (i.e., an MME)

Location: IP address of MME

Pool ID: An ID that refers to all nodes in the pool in MMEs, UPEs and Base stations.

The MME Status information comprises the following:

MME load: The current load of the gateway is provided with a necessary granularity. Moreover, to avoid frequent load updates hysteresis is applied.

MME availability information: In order to detect MME failures, availability of servers is also updated. A special keep alive message may be exchanged to speed up detection of failed gateways.

Server/Gateway Selection with the Pool

As mentioned above, the advertisement messages sent by entities such as the user plane entities 23 and mobility management entities 25 facilitate selection of a server/gateway within a pool. For example, using the advertised information (e.g., such as advertisement front 34 previously described), a selection unit 44 of a mobility management entity (MME) 25 can select a user plane entity (UPE) 23 for a communication involving a wireless station (WS).

Figure 6:
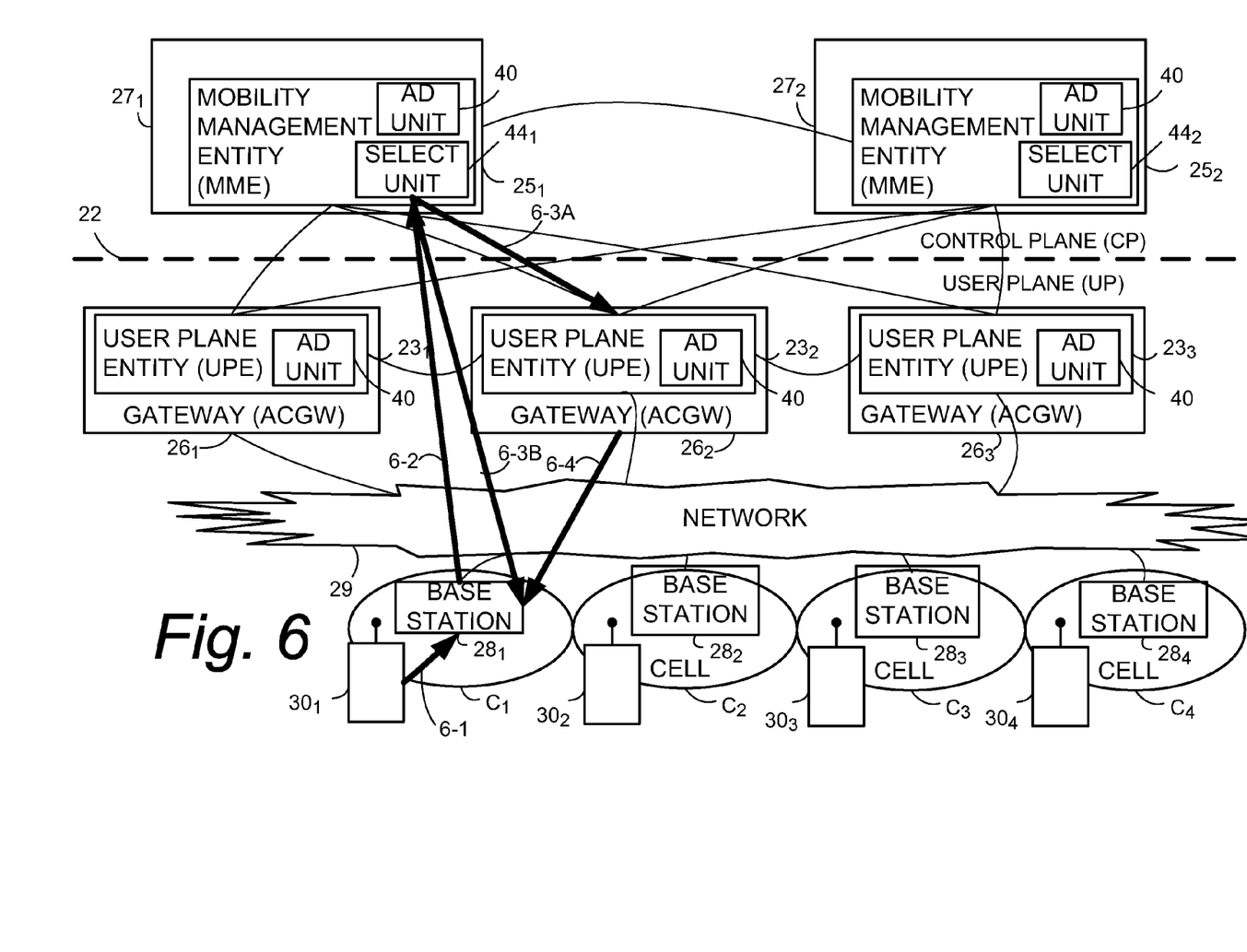
FIG. 6 is a diagrammatic view of the network of FIG. 1 showing example wireless station (WS) attachment acts or steps.

FIG. 6 is a diagram showing attachment acts or steps for a wireless station (WS). The acts or steps of FIG. 6 are as follows: In act 6-1, a user turns on its wireless station (WS), such as wireless station $30_1$ illustrated by way of example, and thereby begins or initiates an attachment procedure via Base station $28_1$ (the Base station which serves the cell in which wireless station $30_1$ is situated). This process is responsible to bind the control plane (CP) gateway and user plane (UP) gateway to the wireless station (WS). As act 6-2, a mobility management entity (MME) is selected for the user. In the particular implementation of FIG. 6, as act 6-2 mobility management entity (MME) $25_1$ is selected for the user of wireless station $30_1$. MME selection can be done by Base stations 28 and involve interpreting MME advertisements (e.g., such as advertising information included in advertisement front 34 previously described).

After the mobility management entity (MME) 25 is selected, as act 6-3 the mobility management entity (MME) selects a user plane entity (UPE). In the particular implementation and situation of FIG. 6, as act 6-3A the selection unit $44_1$ of mobility management entity (MME) $25_1$ selects user plane entity (UPE) $23_2$. Act 6-3B of FIG. 3A shows selection unit $44_1$ informing Base station $28_1$ that user plane entity (UPE) $23_1$ has been selected as the user plane entity (UPE) for wireless station $30_1$.

As act 6-4 the User Plane Entity (UPE)—wireless station (WS) binding is installed in the network. Act 6-4 thus involves setting routers or establishing/providing appropriate routing information in/for nodes of network 29 to accomplish the binding of the chosen user plane entity (UPE) with the wireless station (e.g., the binding of user plane entity (UPE) 23, and wireless station $30_1$ in the present example).

As mentioned above, act 6-3A of FIG. 6 involved a selection unit 44 of a mobility management entity (MME) 25 selecting a user plane entity (UPE) 23. The selection unit 44 operates on the basis of logic or criteria or an algorithm which can be different for different operators. As one example selection logic, a selection unit 44 can use the closest UPEs from the ones that have load less than 50% and that support internet access. Whatever the logic or criteria or algorithm, the selection unit 44 can take into consideration one or more factors.

Figure 7:
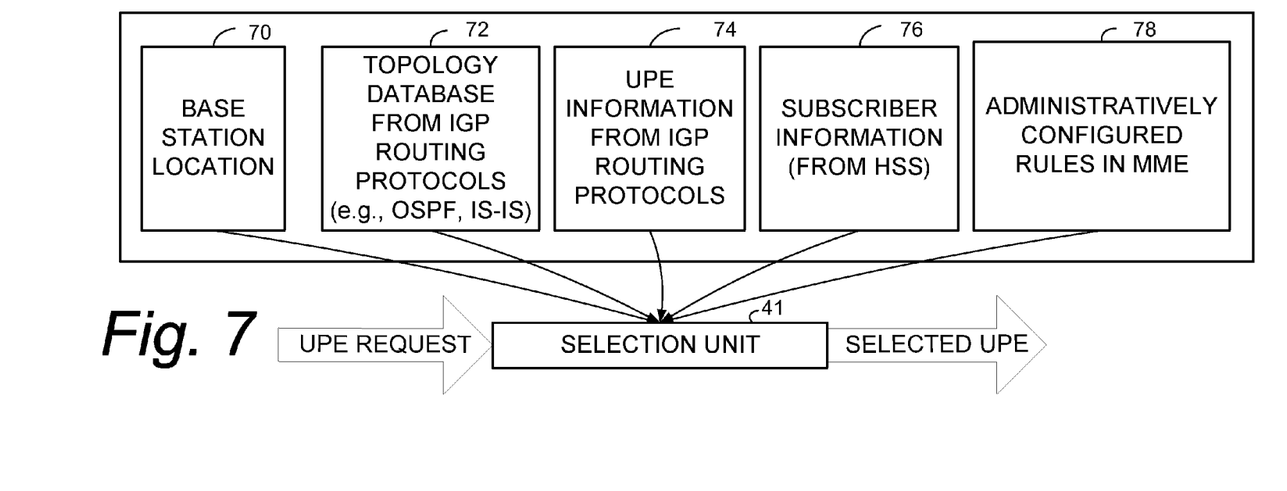
FIG. 7 is a diagrammatic view showing an example UPE selection unit and input factors utilized thereby.

Example factors taken into consideration by selection unit 44 in making a selection of a user plane entity (UPE) are shown in FIG. 7. In particular, FIG. 7 shows selection unit 44 taking into consideration one or more of the following factors: Base station location 70; topology information 72 from topology database from IGP routing protocols (e.g., OSPF, IS-IS); UPE information 74 from IGP routing protocols; subscriber information 76 (from a Home Subscriber Server (HSS)); and, administratively configured rules 78 (configured in mobility management entity (MME)). In other words, in UP gateway (e.g., UPE) selection, input into selection unit 44 (e.g., into to a UPE selection function in MME) can include: (1) the IP address of the Base station where the request comes from (e.g., Base station location 70); (2) UPE info as proposed in the Extension of IGP Protocols (e.g., UPE information 74); (3) information on the transport network interconnecting the Base station and the UPEs as obtained, e.g., from IGP routing protocols (e.g., topology information 72); and (4) Subscriber data from a Home Subscriber Server (HSS) (e.g., subscriber information 76).

By considering the routing information (e.g., network topology, link cost, available bandwidth, link protection capabilities, . . . etc.) for the binding between UPEs and wireless stations, transport efficiency can be improved.

Considering User Plane Entity (UPE) loads in the selection process allows load balancing of user plane entities 23. Moreover, by incorporating service capability in the decision (e.g., the selection by selection unit 44), it can be ensured that the best UPE is selected for each service (e.g., corporate access, Internet access, . . . etc.). Considering actual server load allows for a more intelligent gateway selection where the load of each specific node of the pool is balanced, so the total system can serve more users.

Configured rules (e.g., administratively configured rules 78) can be used to administratively restrict or force the selection of specific UPEs. Today for example, common practice is to bind gateways to specific regions, and all request initiated within the region is served by the administratively associated gateway.

As indicated above, the Subscriber data can be obtained from a Home Subscriber Server (HSS). The HSS is the master database for the mobile networks. The HSS holds variables and identities for the support, establishment and maintenance of calls and sessions made by subscribers. This includes the subscriber's IMSI, security variables and location information. As well as the basic HLR/AuC functions, the HSS may be enhanced through the use of additional databases and reference points.

In the technology herein described, traffic engineering (TE) is based on constrained routing and path selection. Instead of choosing the shortest path between two endpoints, additional metrics are considered by the route selection algorithms. The intelligent UPE selection problem can be formulated as a special constraint path selection. Besides the usual TE metrics of links (like link cost, link protection, available bandwidth, link color) node specific information should be also accounted for. That is, detailed node characteristics should also be represented in the TE topology. Hence, UPE selection can be bound to transport optimization. The UPE selection algorithm should specify that a shortest path is needed between the Base station serving the attaching WS and the UPE, and additionally restrictions to the UPE load and/or service.

As used above, "link color" is a means of traffic engineering that allow network operators to specify the link groups in the network by configuration (links with the same color belong to the same group). If the color of a new LSP is specified then only the links with the same color could be used by the specific LSP.

Automatic Pool Configuration with Built-In Redundancy

Pooling of nodes and entities has been described above with reference to the example of FIG. 3A and FIG. 3B. When a pool P is created or configured, it is created/configured so that the same pool identifier (Pool ID) is configured in all Base stations 28, user plane entities (UPEs) 23, and mobility management entities (MMEs) 25 that should belong to, or are associated with, or utilize the same pool. As UPEs and MMEs advertise their pool membership as described above (e.g., in Extension of IGP Protocols Section 1.0), Base stations 28 are always able to listen to these advertisements and to discover which MMEs 25 and UPEs 23 belong to or are associated with the same pool P, to which they (the Base station 28) also belong or are assigned for use.

Whenever an MME 25 or a UPE 23 is removed from a pool, no further advertisements are issued by the Mobility Management Entity (MME) 25 or the User Plane Entity (UPE) 23, and therefore no further advertisements are received by the corresponding nodes. Accordingly, removed user plane entities 23 and mobility management entities 25 are not selected in new MME/UPE selection requests.

Therefore, UPE/MME selection inherits the built-in redundancy property of IP networks.

The technology thus concerns a mobile communication system having physically a user plane which is physically separated from a control plane, with the user plane having user plane entities 23 and the control plane having mobility management entities 25, and using (for example) an Interior Gateway Protocol (IGP) for exchanging routing information. The mobility management entities 25 can be organized in a first pool and the user plane entities 23 can be organized in a second pool in a manner such as that illustrated, by way of example, with reference to FIG. 3A and FIG. 3B. In such an organizational scheme, a method is employed for automatic distribution of configuration and status information between the mobility management entities 25 and user plane entities 23. The method comprises incorporating dynamic information into the entity selection of said IGP. Such dynamic information comprises selection of entity within the pool and automatic pool configuration with built-in redundancy. The IGP can be Routing Information Protocol (RIP) or Open Shortest Path First (OSPF) protocol or Intermediate System to Intermediate System (IS-IS). The Router Information LSA is extended for OSPF or the ISIS Capability TLV for ISIS. The UPE and MME send IGP messages to advertise their capability and status information.

Example Advantages and Epilogue

Advantageously, dynamic status update provides high service availability even if low cost (unreliable) UPEs are deployed. Moreover, plug & play network deployment and fast network extension and reconfiguration is easier dynamic UPE selection. The efficiency of load balancing of UPEs and transport links may be increased with the implementation of the invention. Moreover, management and configuration complexity and cost can be reduced by adding intelligence into the UPE selection process.

A system and method is disclosed that automatically distributes configuration and status information between gateways and servers by the extension of TOP routing protocols (OSPF and IS-IS) to allow for: (1) intelligent gateway selection (e.g., UPE selection) using status and configuration of gateways/servers and to combine it with transport information; and, (2) easier pool configuration where adding a new node (Base station, UPE, MME) does not require any configuration in the "old" members of the pool.

Dynamic status update provides high service availability even if low cost (e.g., unreliable) UPEs are deployed. Moreover, plug & play network deployment and fast network extension and reconfiguration simplify dynamic UPE selection. The efficiency of load balancing of UPEs and transport links may be increased with the implementation of the invention. Moreover, management and configuration complexity and cost can be reduced by adding intelligence into the UPE selection process.

Thus, a method is provided for a mobile communication system having physically separated user plane with User Plane Entities (UPE) and control plane with Mobility Management Entities (MME), and using an Interior Gateway Protocol (IGP) for exchanging routing information. In an example implementation, the MMEs are organized in a first pool and the user plane entities are organized in a second pool. The method involves automatic distribution of configuration and status information between said mobility management entities and the user plane entities. The method comprises incorporating dynamic information into the entity selection of said IGP, the information comprising selection of entity within the pool and automatic pool configuration with built-in redundancy. In example implementations, the IGP can be, e.g., Routing Information Protocol (RIP) or Open Shortest Path First (OSPF) protocol or Intermediate System to Intermediate System (IS-IS). The method can further comprise extending the Router Information LSA for OSPF or the ISIS Capability TLV for ISIS. Further, both the user plane entity and the Mobility Management Entity (MME) can send IGP messages to advertise their capability and status information.

Thus, system and method are disclosed which automatically distribute configuration and status information between gateways and servers by the extension of IGP routing protocols (e.g., Open shortest Path First Protocol [OSPF] and Intermediate System to Intermediate System [IS-IS]) in a mobile system. The system and method allow for intelligent gateway selection (e.g., UPE selection) using status (load and reachability of servers) and configuration (e.g., supported services, pool membership) of gateways/servers and to combine it with transport information (information distributed by traffic engineering extensions of IGP routing protocols). The system and method further allow for easier pool configuration where adding a new node (Base station, UPE, MME) does not require any configuration in the "old" members of the pool.

The functions of the entities described herein (e.g., one or more of user plane entities 23 and mobility management entities 25) and the functions of units such as selection unit 44 and advertisement unit 40 can be performed by a controller or processor, so those terms are hereinbefore expansively described.

Using dynamic transport information allows for the optimization of resource usage in the transport network, which results less bandwidth requirement in the user plane. Transport information is especially important in the case of user plane pooling.

Pooling provides an inherent redundancy (N+M) that relaxes the reliability requirement of specific nodes without compromising the reliability of the network. In a solution with many low-availability elements acting as a single high-availability node, the available nodes in the pool are changing relatively frequently, which calls for more dynamic information into the gateway selection process.

Taking into account service capability information involves manual configuration, which makes it more difficult to use pools in an environment where each node supports a different set of services.

Therefore, incorporating dynamic information into the gateway selection would increase network efficiency and reliability, and it would reduce network management complexity (save on operating expenses (OpEx)).

TABLE 1

LSA HEADER

| Field | Description |
|---|---|
| LS age: | The time in seconds since the LSA was originated. |
| Options: | The optional capabilities supported by the described portion of the routing domain. |
| LS type: | The type of the LSA. Each LSA type has a separate advertisement format. The LSA types defined in [1] are as follows: Router-LSAs, Network-LSAs, Summary-LSAs (IP network), Summary-LSAs (ASBR), and AS-external-LSAs. |
| Link State ID: | This field identifies the portion of the internet environment that is being described by the LSA. The contents of this field depend on the LSA's LS type. For example, in network-LSAs the Link State ID is set to the IP interface address of the network's Designated Router (from which the network's IP address can be derived). |
| Advertising Router: | The Router ID of the router that originated the LSA. For example, in network-LSAs this field is equal to the Router ID of the network's Designated Router. |
| LS sequence number: | Detects old or duplicate LSAs. Successive instances of an LSA are given successive LS sequence numbers. |
| LS checksum: | The Fletcher checksum of the complete contents of the LSA, including the LSA header but excluding the LS age field. |
| Length: | The length in bytes of the LSA. This includes the 20 byte LSA header. |

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims.

What is claimed is:

1. A system in a mobile communications network having separation between a user plane and a control plane, the system comprising:
    plural entities, the plural entities comprising:
        plural user plane entities comprising the user plane; and
        plural mobility management entities comprising the control plane;
    wherein at least one of said plural entities is configured to transmit advertisement information in at least one of a Routing Information Protocol (RIP) message, an Open Shortest Path (OSPF) protocol message, and an Intermediate System to Intermediate System (ISIS) message, the advertisement information comprising status information and configuration information of the at least one entity, wherein the status information comprises load information and availability information and the configuration information comprises supported services information and pool membership information; and
    a mobility management entity-node of the system for utilizing both the transmitted advertisement information and transport information transported on the user plane to select a user plane entity for attachment to a wireless station serviced by the network, wherein the transport information comprises information distributed by traffic engineering extensions of Interior Gateway Protocol (IGP) routing protocols.

2. The system of claim 1, wherein the plural mobility management entities are organized into pools.

3. A system in a mobile communications network having separation between a user plane and a control plane, the system comprising:
    plural entities, the plural entities comprising:
        plural user plane entities comprising the user plane; and
        plural mobility management entities comprising the control plane;
    wherein at least one of said plural entities is configured to transmit advertisement information, the advertisement information comprising status information and configuration information of the at least one entity, wherein the status information comprises load information and availability information, and the configuration information comprises supported services information and pool membership information; and
    a mobility management entity-node of the system for utilizing both the transmitted advertisement information and transport information transported on the user plane to select a user plane entity for attachment to a wireless station serviced by the network, wherein the transport information comprises information distributed by traffic engineering extensions of Interior Gateway Protocol (IGP) routing protocols.

4. A mobility management entity-node of a mobile communications network having separation between a user plane and a control plane, wherein the node is configured to:
    receive advertisement information from plural pooled user plane entities on the user plane and from plural mobility management entities on the control plane, wherein the advertisement information comprises status information and configuration information of the user plane entities and the mobility management entities, wherein the status information comprises load information and availability information, and the configuration information comprises supported services information and pool membership information;

receive transport information transported on the user plane, wherein the transport information comprises information distributed by traffic engineering extensions of Interior Gateway Protocol (IGP) routing protocols; and utilize both the advertisement information and the transport information to select a user plane entity for attachment to a wireless station serviced by the network.

5. The node of claim 4, wherein the advertisement information is included in at least one of:
 a Routing Information Protocol (RIP) message;
 an Open Shortest Path (OSPF) protocol message; and
 an Intermediate System to Intermediate System (ISIS) message.

6. The node of claim 4, wherein the node is configured to use one or more of the following factors to select the user plane entity:
 location of a radio access network base station node which serves the wireless terminal;
 topology information concerning a transport network interconnecting the base station node which serves the wireless terminal and the user plane entities;
 user plane entity information from an Interior Gateway Protocol (IGP) routing protocol;
 subscriber information; and
 administratively configured rules.

7. A method in a mobility management entity of operating a mobile communications network having separation between a user plane and a control plane, the network including plural entities, the plural entities in turn including plural pooled user plane entities on the user plane and plural mobility management entities on the control plane, the method comprising the steps of:
 receiving advertisement information from at least one of the plural entities, the advertisement information comprising status information and configuration information of at least one of the plural entities, wherein the status information comprises load information and availability information, and the configuration information comprises supported services information and pool membership information;
 receiving transport information transported on the user plane, wherein the transport information comprises information distributed by traffic engineering extensions of Interior Gateway Protocol (IGP) routing protocols; and
 using both said received advertisement information and transport information to select a user plane entity for attachment to a wireless station serviced by the network.

8. The method of claim 7, further comprising storing the received advertisement information in the mobility management entity.

9. The method of claim 7, further comprising including in the status information at least one of information on load on a node in the network, information on load on a link in the network, and availability information.

10. The method of claim 7, further comprising organizing the plural mobility management entities into pools.

11. The method of claim 7, further comprising including the advertisement information in at least one of:
 a Routing Information Protocol (RIP) message;
 an Open Shortest Path (OSPF) protocol message; and
 an Intermediate System to Intermediate System (ISIS) message.

12. The method of claim 7, further comprising including the advertisement information in a routing message.

13. The method of claim 7, further comprising using one or more of the following factors to select the user plane entity:
 location of a radio access network base station node which serves the wireless terminal;
 topology information concerning a transport network interconnecting the base station node which serves the wireless terminal and the user plane entities;
 user plane entity information from an Interior Gateway Protocol (IGP) routing protocol;
 subscriber information; and
 administratively configured rules.

* * * * *

UNITED STATES PATENT AND TRADEMARK OFFICE
CERTIFICATE OF CORRECTION

PATENT NO.        : 8,072,900 B2
APPLICATION NO.   : 12/521129
DATED             : December 6, 2011
INVENTOR(S)       : Antal et al.

Page 1 of 1

It is certified that error appears in the above-identified patent and that said Letters Patent is hereby corrected as shown below:

In Column 6, Line 11, delete "23," and insert -- $23_2$ --, therefor.

In Column 11, Line 48, delete "23," and insert -- $23_2$ --, therefor.

In Column 11, Line 55, delete "23," and insert -- $23_2$ --, therefor.

In Column 13, Line 59, delete "TOP" and insert -- IGP --, therefor.

Signed and Sealed this
Twenty-first Day of February, 2012

David J. Kappos
*Director of the United States Patent and Trademark Office*